United States Patent [19]
Silver et al.

[11] 3,761,798
[45] Sept. 25, 1973

[54] SUPERCONDUCTING CIRCUIT MEANS

[75] Inventors: Arnold H. Silver, Farmington, Mich.; James E. Zimmerman, Santa Ana, Calif.

[73] Assignee: Ford Motor Company, Dearborn, Mich.

[22] Filed: Mar. 3, 1971

[21] Appl. No.: 120,577

Related U.S. Application Data
[62] Division of Ser. No. 809,320, March 21, 1969, Pat. No. 3,622,881.

[52] U.S. Cl.................... 323/1, 307/306, 324/120, 332/51 R, 323/44 F
[51] Int. Cl. ........................... G05f 1/12, G01r 9/26
[58] Field of Search ........................... 332/16, 51 R; 324/120; 307/306; 323/1, 7, 44 F; 331/145, 168, 169

[56] References Cited
UNITED STATES PATENTS
3,600,644   8/1971   Eck.................................... 307/306

*Primary Examiner*—Gerald Goldberg
*Attorney*—John R. Faulkner and Keith L. Zerschling

[57] ABSTRACT

This disclosure relates to a superconducting circuit means that may be utilized as an ultra-high sensitivity voltmeter or a generator generating a voltage having a substantially constant amplitude. It comprises a superconductive material having a weak link positioned therein with means for applying a voltage of unknown magnitude across the weak link. An oscillator has its output coupled to the weak link so that the output signal of the oscillator generates an oscillating current through it. The voltage of unknown magnitude causes an oscillating current to be generated through the weak link with a frequency proportional to the unknown magnitude of the voltage. The weak link mixes the frequency of the two currents and a demodulating means detects the frequency of the oscillating current produced by the voltage of unknown magnitude. When the circuit means is to be employed as a voltmeter, a frequency meter may be connected to the demodulating means which has a scale readable in voltage units. If the circuit means is to be employed as a generator of a voltage having a substantially constant amplitude, a standard frequency may be fed to a comparator that also receives the output from the demodulating means. The output from the comparator may be fed back through suitable means to the weak link and the amplitude of the voltage having a substantially constant magnitude may be read out across a circuit component connected to the superconducting material.

6 Claims, 8 Drawing Figures

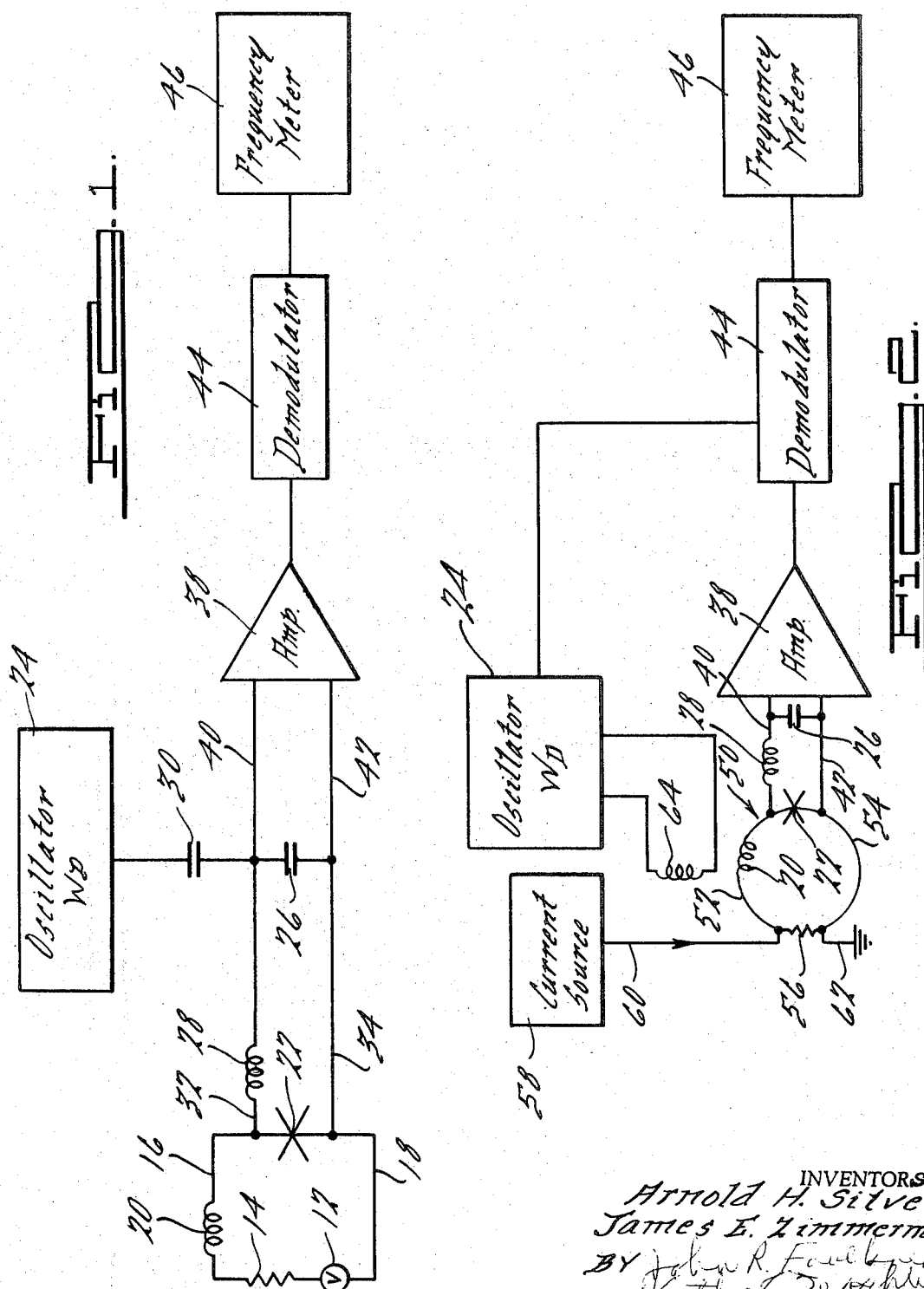

INVENTORS.
Arnold H. Silver
James E. Zimmerman

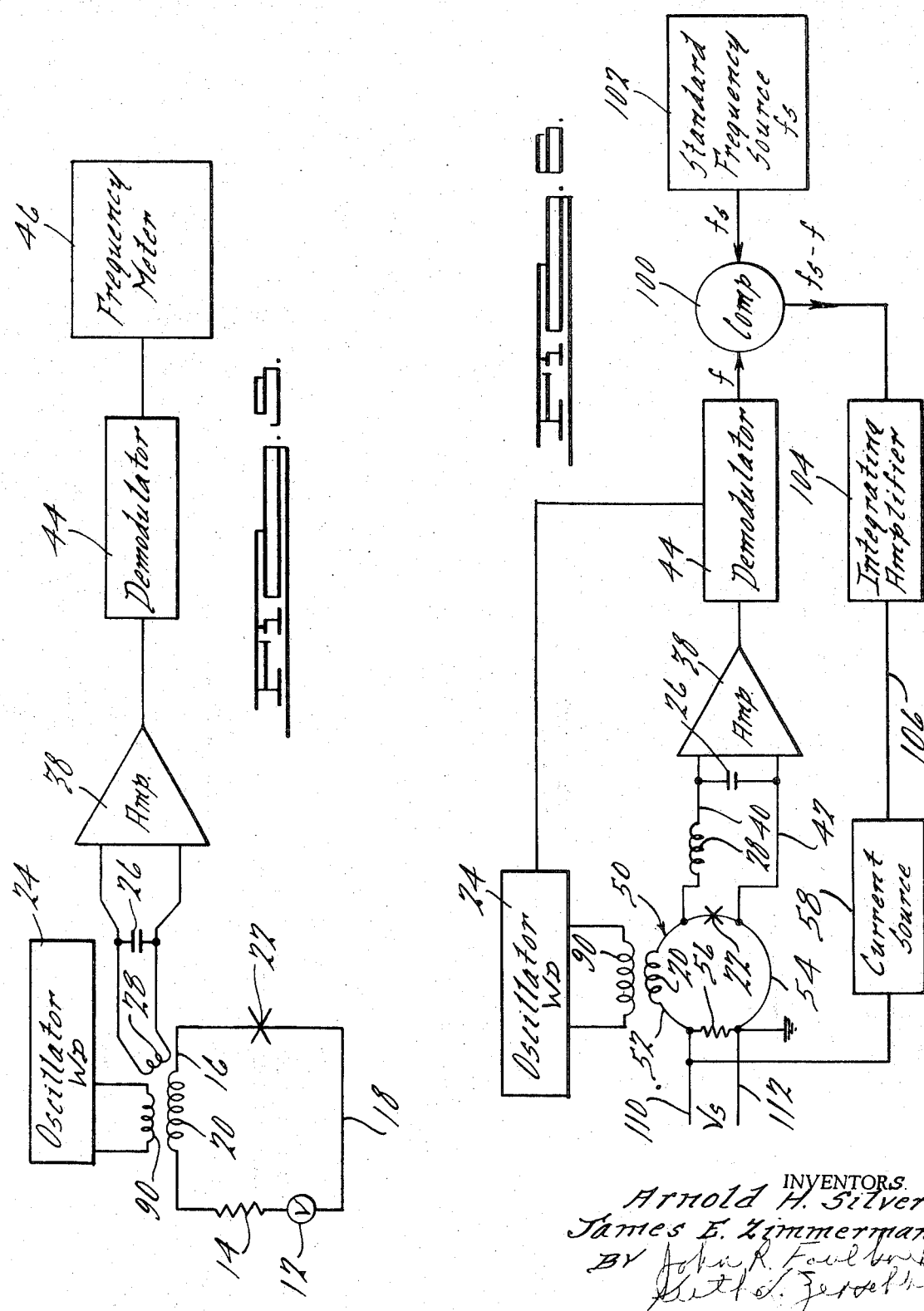

SUPERCONDUCTING CIRCUIT MEANS

This application is a division of our copending application Ser. No. 809,320 filed Mar. 21, 1969 now, U.S. Pat. No. 3,622,881.

BACKGROUND OF THE INVENTION

This invention relates to superconducting circuit means and, more particularly, to superconducting circuit means employing AC Josephson effects to provide either an ultra-high sensitivity voltmeter or a generator of a voltage having a substantially constant magnitude.

It is known in the art that superconducting devices having weak links between two superconductive members, such as point contacts, thin layers of insulating material or a reduced section will generate alternating energy having a frequency which is proportional to the voltage drop across the weak link. This is known as the AC Josephson effect. This voltage is often very small in magnitude and cannot be readily detected. The present invention provides an uncomplicated and inexpensive circuit means for measuring the voltage across the weak link as well as a means for generating a voltage which has a substantially constant amplitude.

SUMMARY OF THE INVENTION

This invention relates to a practical, ultra-high sensitivity superconducting voltmeter and a superconducting circuit means for generating a voltage having a substantially constant amplitude. It utilizes a superconducting material having a weak link positioned therein, for example, a point contact, a thin layer of insulating material or a reduced section. When a DC voltage is applied across such a weak link and the material is reduced to a critical superconducting temperature, an alternating current voltage is produced across the weak link. This voltage may be very small and practically undetectable by conventional electronic equipment. In the present invention an oscillator generating alternating power, preferably in the radio frequency range, is coupled to the weak link and preferably has sufficient power to generate an oscillating current through the weak link equal to the critical current of the weak link. The two alternating current voltages through the weak link are mixed by it to produce an amplitude modulated wave. A demodulating means is coupled to the weak link which will reject the frequency of the electrical energy generated by the oscillator and leave a signal having a frequency which is proportional to the DC voltage applied across the weak link.

The output from the demodulating means may be fed to a frequency meter which will produce an indication of the DC voltage applied across the weak link. This frequency meter may be scaled directly in units of voltage in the range of the DC voltage applied.

In another embodiment of the invention, the output from the demodulating means may be fed to a comparator and a source of electrical energy having a standard frequency may also be fed to the comparator. The comparator will then produce an output which may be fed to an electronic circuit means, preferably an integrating amplifier, to produce an error signal or current. The current or signal may then be fed back through suitable means to the weak link. As a result of this feedback arrangement, a voltage will appear at the weak link which has a substantially constant amplitude. Thus, with this arrangement the invention provides a generator that produces electrical energy having a substantially constant amplitude.

An object of the present invention is the provision of an ultra-high sensitivity superconducting volt-meter which is capable of measuring ultra-low level voltages.

A further object of the invention is the provision of an ultra-high sensitivity superconducting generator that will generate voltage having a substantially constant amplitude.

Other objects and attendant advantages of the present invention may be more readily realized as the specification is considered in connection with the attached drawings.

BRIEF DESCRIPTION OF THE DRAWINGS

FIG. 1 is a block diagram of one embodiment of the superconducting voltmeter of the present invention.

FIG. 2 is a block diagram of another embodiment of the superconducting voltmeter of the present invention.

FIG. 5 is a block diagram of still another embodiment of the present invention.

FIG. 6 is a block diagram of an embodiment of the present invention that will produce or generate an alternating voltage having a substantially constant amplitude.

DESCRIPTION OF THE PREFERRED EMBODIMENT

Figure 8:
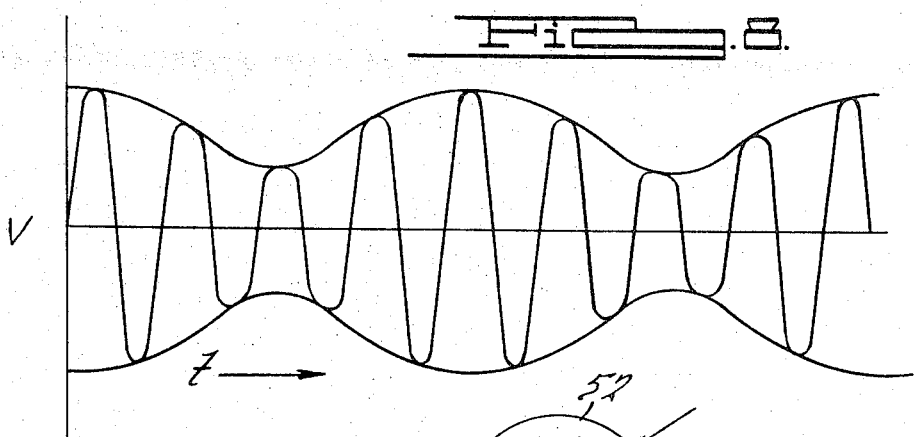
FIG. 8 is a plot of the voltage produced across the weak link of the present invention.

This invention relates to an ultra-high sensitivity superconducting voltmeter or a generating means for generating precise ultra-low standard voltages. It utilizes superconducting point contacts, or other weak connections, between superconductors to measure voltages to the limit of the thermal noise of the voltage source itself. The invention combines the techniques of generation of coherent radiation in voltage biased superconducting point contacts, or other weak link connections, mixing of two frequencies and parametric amplification. Measurement of $4 \times 10^{-16}$ volts with a signal to noise ratio of 10 has been achieved with a source resistance of $10^{-10}$ ohms at 4.2°K. The limit on such measurement is approximately $8k_B TR/\Phi_o$ volts, where $k_B$ is the Boltzmann constant, T the absolute temperature, $\Phi_o$ is the fundamental flux quantum, and R is the source resistance in ohms. Numerically, this limit is approximately $6 \times 10^{-8}$ RT volts. $\Phi_o$, the fundamental flux quantum, is a constant equal to $h/2e$ where h is Planck's constant and e is the electrical charge of an electron.

A schematic diagram of one of the embodiments of the invention is shown in FIG. 1. In this figure, the voltage source 12 represents the voltage to be measured and the resistor 14 represents its internal resistance. Superconducting leads 16 and 18 are coupled to the voltage source 10 and its internal resistance 14, with inductance 20 representing the inductance of the superconducting leads. The superconducting leads are connected by a weak link 22 which may be in the form of point contacts as disclosed in U.S. Pat. No. 3,423,607, a junction comprised of a thin insulating material, as described in U.S. Pat. No. 3,363,200, or a reduced section in a superconducting material.

The superconducting weak link 22 has a critical or maximum supercurrent $i_c$, and it is preferred to make this critical or maximum supercurrent approximately equal to $\Phi_o/L$ where L is the inductance of the superconducting leads and $\Phi_o$ is a unique or precise physical constant given above as the fundamental flux quantum. For the circuit shown in FIG. 1, an oscillating current of magnitude $\Phi_o/2L$ will flow through the superconducting leads 16 and 18. This current has a fundamental frequency of $f = V/\Phi_o$ which is the common AC Josephson effect relationship and in which V is the voltage across the superconducting weak link 22. For $f$, greater than $R/2\pi L$, where R is the internal resistance 14 and L is the inductance 20 of the superconducting leads 16 and 18, the oscillating voltages appearing across both the inductance 20 and the weak link 22 are approximately equal. The magnitude of this oscillating voltage is approximately equal to $\Phi_o f$. This AC voltage can be detected either across the point contact, as shown in FIG. 1, or across the inductance 20 by inductive coupling.

In the form shown in FIG. 1, an rf oscillator 24 is provided producing energy having an angular frequency of $W_D$. A resonant circuit comprised of capacitor 26 and inductor 28 having a resonant frequency equal to $W_D$ is also provided. The oscillator 24 is coupled to the resonant circuit comprised of capacitor 26 and inductor 28 by a small capacitor 30. The resonant circuit comprised of the capacitor 26 and the inductor 28 is coupled or connected across the superconducting weak link 22 via leads 32 and 34. The power level of the oscillator 24 is preferably adjusted so that the current produced across or through the superconducting weak link or point contact is nonlinear, that is, this induced current is equal to $i_c$, the critical or maximum supercurrent through the superconducting weak link 22.

This maximum or critical supercurrent, $i_c$, may typically be $10^{-5}$ amps. The voltage at the input to the amplifier 38, which is coupled to the resonant circuit comprised of inductance 28 and capacitor 26 via leads 40 and 42, is $10^{-5} W_D L_o$, where $L_o$ is the inductance of inductance 20. If the characteristic impedance, $W_D L_o$, is approximately 10 ohms, the voltage input to the amplifier 38 will be $10^{-4}$ volts.

The device including the superconducting weak link 22, which may be in the form of a point contact, mixes these two frequencies $W_D$ and f providing sidebands at $W_D \pm 2\pi f$, with the reference signal being $W_D$. With f less than the band width of the amplifier 38 and the resonant circuit comprised of capacitor 26 and inductor 28, the demodulator 44 will recover precisely the frequency $f$ by phase detecting $W_D \pm 2\pi f$ with the reference signal $W_D$. The output signal from the demodulator 44, which has a frequency $f$ equal to $V/\Phi_o$, may be measured by applying it to frequency meter 46. Since $\Phi_o$ is the precise or unique physical constant equal to $h/2e$, the frequency meter will read-out the voltage V by the voltage source 12. Thus, the circuit of FIG. 1 provides an ultra-high sensitivity precision voltmeter.

The amplitude of the oscillating voltage at the weak link or superconducting point contact 22 is approximately equal to $\Phi_o f \times W_D/2\pi f$ which is equal to $\Phi_o W_D/2\pi$. This corresponds to amplification equal to the frequency ratio of the AC Josephson alternating signal and the frequency of the signals applied by the oscillator 24. This is typical of parametric amplifiers. It can be seen, therefore, that the output voltage level is independent of the frequency f and is sufficiently large to allow precise measurement of the frequency f and hence precise measurement of the voltage supplied by the voltage source 12.

Another embodiment of the invention is shown in FIG. 2. In this embodiment, a superconducting ring 50 is provided having a structure which will be more fully explained in relationship to FIGS. 3 and 4. Suffice it to say for the purposes of describing FIG. 2, this superconducting ring has a first superconducting section 52, a second superconducting section 54. These two superconducting sections 52 and 54 are separated by a resistive section 56 constructed of a normal metal which is nonsuperconducting at temperatures at which the sections 52 and 54 are superconducting. The two sections of superconducting material are also separated by the weak link, preferably in the form of a point contact 22. A current bias or source 58 is connected in series with the resistive section 56 via leads 60 and 62 thereby developing a voltage across the resistive section 56 equal to the value of current flowing in line 60 times the resistance of the resistive section 56. Since the superconducting sections 52 and 54 are substantially resistance-free at superconducting temperatures, this voltage will appear across the weak link or superconducting point contact 22. An oscillating voltage therefore appears across the superconducting weak link 22 having a frequency proportional to the voltage drop across the resistive section 56 due to the AC Josephson effect. The oscillator producing the energy having an angular frequency equal to $W_D$ may be inductively coupled to the superconducting ring 50 through an inductance 64 and the inductance of the superconducting ring designated by the numeral 20. In the alternative, the arrangement shown in FIG. 1 may be employed where the oscillator 24 is coupled to the weak link 22 via the capacitors and the inductor shown there, that is, capacitor 30 and the resonant circuit comprised of capacitor 26 and capacitor 28. The output signal applied to the amplifier 38 will be substantially identical to the signal applied to the amplifier 38 shown in FIG. 1 and this signal will be detected in the demodulator 44 that receives a signal from the oscillator 24. The frequency of the output signal from the demodulator 44 will be measured by frequency meter 46. Thus, with the current from source 58 known, the frequency meter 46 will measure directly the resistance of resistive section 56.

Figure 3:
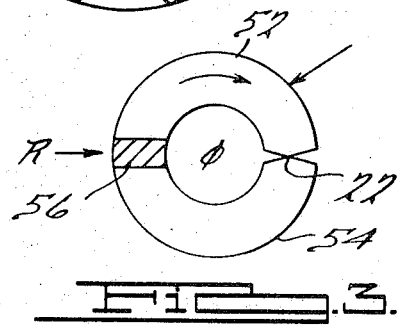
FIG. 3 is a schematc view of a superconducting ring that may be employed with the embodiment shown in FIG. 2. 2.
Figure 4:
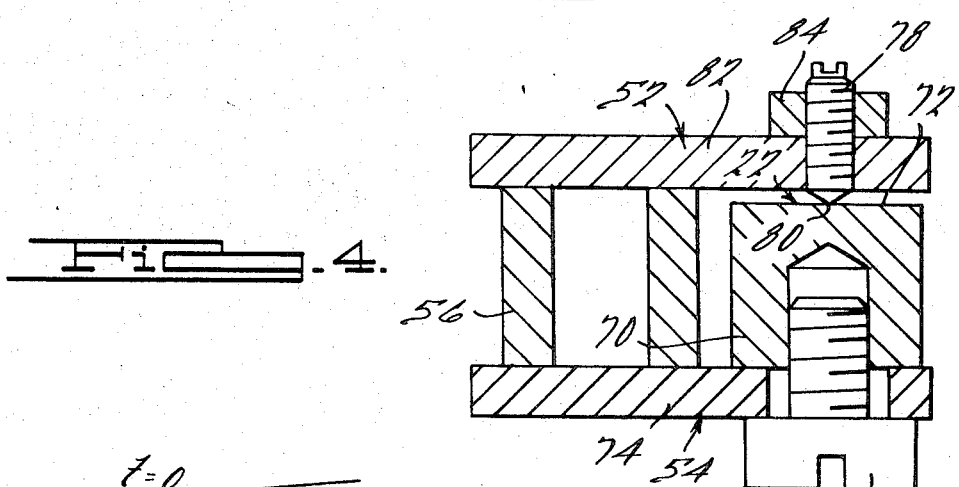
FIG. 4 is a sectional view showing the actual structure of the superconducting ring disclosed diagrammatically in FIG. 3.

Referring now to FIGS. 3 and 4, there is shown in FIG. 3 the superconducting ring 50 which is comprised of the two sections 52 and 54 of superconducting material and the resistive section 56 comprised of a material, for example, copper which is nonsuperconducting at the temperatures at which the sections 52 and 56 are superconducting. The weak link is shown at 22 and may comprise a point contact as shown more specifically in FIG. 4.

In FIG. 4, a block of superconducting material 70 is provided which has an enlarged flat surface 72. This block of superconducting material 70 may be affixed to a plate 74 of superconducting material and attached thereto by a bolt 76. A screw 78 constructed of superconductive material and having a sharp point 80 positioned thereon is threaded into a second plate of superconducting material 82. The screw 78 may be turned so that the point 80 comes in contact with the surface 72 under a given pressure. A lock nut 84 is provided for locking the screw 78 in a proper position. The resistive section 56 is positioned between the plates 74 and 82 and the leads 60 shown in FIG. 2 are connected directly to the section 56. The plate 82 and screw 78 form the superconducting section 52 of ring 50 shown in FIG. 3 and the plate 74 and block 70 form the section 54 of this ring.

Another embodiment of the invention is shown in FIG. 5. This embodiment of the invention is the same as that shown in FIG. 1 except that both the oscillator 24 and the amplifier 38 are inductively coupled to the inductance of the superconducting leads 16 and 18 represented by the inductance 20. This coupling from the oscillator 24 may be done through an inductor or winding 90, while the inductive coupling to the amplifier 38 may be done through inductor or winding 28. As was stated in relationship to the description of FIG. 1, when the frequency f of the AC Josephson voltage is greater than $R/2\pi L$, where R is the internal resistance represented by resistor 14 of the source 12 and L is the value of inductance 20, almost equal oscillating voltages appear across the inductance of the superconducting leads 16 and 18 represented by the inductance 20 and the weak link 22. It can be seen, therefore, that the signal applied to the amplifier 38 in the embodiment shown in FIG. 5 is the same as the signal applied to the amplifier 38 shown in FIG. 1, since the oscillator 24 will inject the signal $W_D$ into the amplifier via the coupling between the windings 90 and 92 and the signal $W_D \pm 2\pi f$ will be injected into the amplifier 38 from inductance 20 coupled to winding 92.

Referring now to FIG. 6, there is shown a block diagram of a constant voltage generator employing the principles of the present invention, and that utilizes the superconducting ring 50 with the resistive section 56 shown in FIGS. 2, 3 and 4. In this embodiment, the output frequency of the signal from the demodulator 44 will be proportional to the magnitude of the voltage produced across weak link 22 as it is in the other embodiments of the invention. This signal, having this frequency, is applied to a comparator 100. A conventional voltage source having a standard frequency, $f_s$, has its output coupled to the comparator 100 and the comparator will compare the standard frequency $f_s$ with the frequency produced by the demodulator 44. The output from the comparator is a signal which is proportional to the difference between the frequency f and $f_s$. This output may be fed to an integrating amplifier or other circuit means 104 which will produce an error signal. This error signal may be fed to the current source 58 to change the magnitude of the current through resistive section 56. The current source 58 may be set to produce a current through resistive section 56 that will produce a standard voltage, $V_s$, corresponding to the standard frequency $f_s$. Thus, if the difference in the frequencies has a value other than zero, an error signal will be fed from the integrating amplifier 104 to the current source 58. If the value of $f_s$-$f$ is positive, an error signal will be produced by the integrating amplifier 104 that will increase the current from the current source 58, thus increasing the voltage drop across resistive section 56 and consequently the voltage across the weak link or point contact 22. This increases the frequency of the AC Josephson voltage appearing on leads 40 and 42 and brings the whole system back into balance. On the other hand, if the value of $f_s$-$f$ is negative, the integrating amplifier 104 will produce a signal that will decrease the output from the current source thereby reducing the voltage across resistive section 56 and the weak link 22. This reduces the frequency of the AC Josephson voltage appearing across the weak link and the system is brought back into balance. As a result of this arrangement of circuit components, a standard voltage $V_s$ will be generated across the resistive section 56 and will appear across leads 110 and 112.

Figure 7:
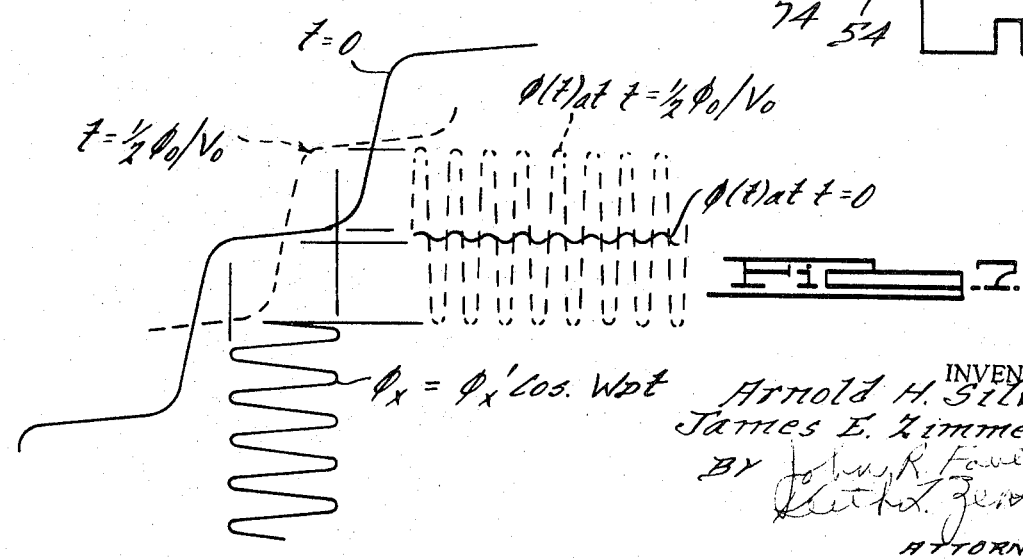
FIG. 7 discloses the transfer characteristic of the weak link of the present invention with input signals and output signals.

If $W_D$ is made very much larger than R/L where R is the value of the resistance 14 and L is the value of the inductance of the superconducting material shown at 20, the dynamic curve shown in FIG. 7 may be employed to obtain the response to the signal produced by the oscillator 24. If it is assumed that the amplitude of the output signal of the oscillator 24 is fixed in terms of magnetic field as slightly less than $\Phi_o/2$, at any instant in time (T = 0) when the dynamic magnetization curve is in the position shown by the solid line, the output response shown on the abscissa will be very small. However, this magnetization curve is sliding at a 45° angle from lower left to upper right at a rate of $f = V_o/\Phi_o$ so that at a later time, $T = \Phi_o/2V_o$, it has moved by half a flux quantum to the position shown by the dashed curve on the abscissa. It can be appreciated that the response, therefore, has grown accordingly with the input shown on the ordinate as the input from the oscillator. The output of the device at $W_D$ is nearly 100 percent amplitude modulated by the Josephson frequency $f = V_o/\Phi_o$ and this amplitude modulation is shown in FIG. 8. Thus, the output across the superconducting weak link 22 or the inductance of the superconducting material or leads 16 and 18 represented by the inductance 20 takes the form shown in FIG. 8. This output is fed to the amplifier 38 for suitable amplification and the signal is then demodulated in the demodulator 44 to leave the signal shown in the envelopes in FIG. 8 which is the Josephson frequency.

The present invention has the advantage of measuring very low voltages across low impedance sources at low temperatures with a very low power input to the low temperature region. The power dissipated in the device comprising the leads 16 and 18 and the weak link 22 shown in FIGS. 1 and 6 and the superconducting ring with the resistive section shown in FIGS. 2 and 5 is essentially negligible in almost all cases. The present invention may be applied to low temperature thermometry utilizing either a conventional thermometer, i.e., a thermocouple which will produce an output voltage proportional to temperature and which may comprise the voltage source 12 with the internal resistance 14 shown in FIGS. 1 and 5 or which may comprise the current source 58 shown in FIG. 2 with the output current from the thermocouple comprising the output current from this current source. Also, the noise voltage of a small resistance element, i.e., the resistive element 56 due to temperature may be measured. The invention may also be applied to low temperature thermoelectric standardization to produce a standard output voltage as shown in FIG. 6 and may also be applied as a high sensitivity radiation detector.

The invention disclosed will have many modifications which will be apparent to those skilled in the art in view of the teachings of this specification. It is intended that all modifications which fall within the true spirit and scope of this invention be included within the scope of the appended claims.

We claim:

1. A superconducting circuit means comprising a superconductive material having a weak link positioned therein, means applying a voltage across said weak link, an oscillator, means coupling the output of said oscillator to said weak link, the output signal of said oscillator generating an oscillating current through said weak link, said voltage causing an oscillating current to be generated through said weak link having a frequency proportional to the magnitude of said voltage, said weak link mixing the frequency of said two currents, a demodulating means coupled to said superconducting material for detecting the frequency of said oscillating current produced by said voltage, a source producing a standard frequency, a comparator, said comparator having a first input, a second input and an output, said first input coupled to said demodulator, said second input coupled to said source producing the standard frequency, said comparator producing a signal having a magnitude that is a function of the difference between the frequency of said standard frequency and the frequency of the output of said demodulator, means coupled to said comparator for producing an error signal, means coupling said last mentioned means to said means applying a voltage across said weak link for adjusting the voltage to a value to produce a signal at the output of said demodulating means having a frequency equal to the frequency of said standard frequency, and output means coupled to said superconducting material, whereby a voltage is impressed on said output means having a magnitude corresponding to the frequency of said standard frequency.

2. The combination of claim 1 in which said means applying a voltage across said weak link comprises a resistive section in a loop of superconductive material having the weak link position therein and a current source coupled to said resistive section, and said error signal is applied to said current source to adjust the magnitude of the current produced thereby.

3. The combination of claim 2 in which said output means is connected across said resistive section.

4. The combination of claim 1 in which said oscillator produces an output signal having sufficient power to generate an oscillating current in said weak link having a maximum instantaneous magnitude at least equal to the active current of said weak link.

5. The combination of claim 4 in which said means applying a voltage across said weak link comprises a resistive section in a loop of superconductive material having the weak link positioned therein and a current source coupled to said resistive section, and said error signal is applied to said current source to adjust the magnitude of the current produced thereby.

6. The combination of claim 5 in which said output means is connected across said resistive section.

* * * * *